(12) United States Patent
Kobayashi

(10) Patent No.: US 11,449,617 B2
(45) Date of Patent: Sep. 20, 2022

(54) INFORMATION PROCESSING DEVICE, INFORMATION PROCESSING METHOD, AND STORAGE MEDIUM

(71) Applicant: NEC Corporation, Tokyo (JP)

(72) Inventor: Toshiki Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 127 days.

(21) Appl. No.: 16/965,727

(22) PCT Filed: Jan. 21, 2019

(86) PCT No.: PCT/JP2019/001641
§ 371 (c)(1),
(2) Date: Jul. 29, 2020

(87) PCT Pub. No.: WO2019/151013
PCT Pub. Date: Aug. 8, 2019

(65) Prior Publication Data
US 2021/0034758 A1    Feb. 4, 2021

(30) Foreign Application Priority Data

Feb. 2, 2018 (JP) ................................ JP218-017006

(51) Int. Cl.
*G06F 7/04* (2006.01)
*H04N 7/16* (2011.01)
(Continued)

(52) U.S. Cl.
CPC ........ *G06F 21/577* (2013.01); *G06F 9/30101* (2013.01); *G06F 9/546* (2013.01);
(Continued)

(58) Field of Classification Search
CPC .... G06F 21/577; G06F 9/30101; G06F 9/546; G06F 21/54; G06F 21/565; G06F 21/568;
(Continued)

(56) References Cited

U.S. PATENT DOCUMENTS

2004/0139342 A1    7/2004 Aho et al.
2005/0066169 A1*   3/2005 Kiehtreiber ............. G06F 21/54
                                                        713/176
(Continued)

FOREIGN PATENT DOCUMENTS

JP    2003-333038 A    11/2003
JP    2007-506187 A    3/2007
(Continued)

OTHER PUBLICATIONS

Extended European Search Report for EP Application No. 19748299.5 dated Oct. 27, 2020.
(Continued)

*Primary Examiner* — Trong H Nguyen
(74) *Attorney, Agent, or Firm* — Sughrue Mion, PLLC

(57) ABSTRACT

An information processing device according to the present invention includes: a storage unit that stores a first unique value calculated for each portion of a program in advance; and an inspection unit that inspects whether or not there is a tampering in the portion by newly calculating a second unique value for the portion and comparing the first unique value with the second unique value.

8 Claims, 18 Drawing Sheets

(51) Int. Cl.
  *G06F 21/57* (2013.01)
  *G06F 9/30* (2018.01)
  *G06F 9/54* (2006.01)
  *G06F 21/54* (2013.01)
  *G06F 21/56* (2013.01)
  *G06F 21/64* (2013.01)

(52) U.S. Cl.
  CPC ............ *G06F 21/54* (2013.01); *G06F 21/566* (2013.01); *G06F 21/64* (2013.01)

(58) Field of Classification Search
  CPC .......... G06F 21/64; G06F 21/53; G06F 21/74; G06F 21/51
  See application file for complete search history.

(56) References Cited

U.S. PATENT DOCUMENTS

| | | |
|---|---|---|
| 2006/0005000 A1 | 1/2006 | King et al. |
| 2009/0154314 A1 | 6/2009 | Nishida |
| 2009/0327801 A1 | 12/2009 | Maeda et al. |
| 2011/0231668 A1 | 9/2011 | Schluessler et al. |
| 2016/0246960 A1* | 8/2016 | Chauvet ................... G06F 21/44 |
| 2017/0235957 A1* | 8/2017 | Maletsky ............... H04L 9/3066 713/168 |
| 2017/0323120 A1* | 11/2017 | Anderson ............... G06F 21/64 |
| 2018/0096132 A1* | 4/2018 | Abe ......................... G06F 21/44 |

FOREIGN PATENT DOCUMENTS

| | | |
|---|---|---|
| JP | 2009-009372 A | 1/2009 |
| JP | 2010-009269 A | 1/2010 |
| JP | 2010-009442 A | 1/2010 |
| JP | 2012-078953 A | 4/2012 |
| JP | 2015-084006 A | 4/2015 |
| WO | 2011/142095 A1 | 11/2011 |

OTHER PUBLICATIONS

International Search Report for PCT Application No. PCT/JP2019/001641, dated Mar. 19, 2019.

Japanese Office Communication for JP Application No. 2019-569013 dated Apr. 12, 2022 with English Translation.

* cited by examiner

FIG. 2A

| I/O-ID | API-ID |
|---|---|
| I/O-1 | API-1 |
| I/O-1 | API-2 |
| I/O-2 | API-1 |
| I/O-3 | API-3 |
| ... | ... |

FIG. 2B

| API-ID | func-ID |
|---|---|
| API-1 | func-1 |
| API-1 | func-2 |
| API-2 | func-2 |
| API-3 | func-2 |
| API-3 | func-3 |
| ... | ... |

FIG. 2C

| API-ID | memory addr |
|---|---|
| API-1 | 0x0050-0x0099 |
| API-2 | 0x0220-0x0299 |
| API-3 | 0x0350-0x0399 |
| ... | ... |

FIG. 2D

| func-ID | memory addr |
|---|---|
| func-1 | 0x0100-0x0199 |
| func-2 | 0x0200-0x0219 |
| func-3 | 0x0300-0x0349 |
| ... | ... |

FIG. 4A

| I/O-ID | Hash value | memory addr |
|---|---|---|
| I/O-1 | zzzzzzzz | 0x0050-0x0349 |
| I/O-2 | xxxxxxxx | 0x0050-0x0219 |
| I/O-3 | ssssssss | 0x0200-0x0219, 0x0300-0x0399 |
| ... | ... | ... |

FIG. 4B

| API-ID | Hash value | memory addr |
|---|---|---|
| API-1 | xxxxxxxx | 0x0050-0x0219 |
| API-2 | yyyyyyyy | 0x0200-0x0349 |
| API-3 | tttttttt | 0x0350-0x0399 |
| ... | ... | ... |

FIG. 4C

| func-ID | Hash value | memory addr |
|---|---|---|
| func-1 | aaaaaaaa | 0x0100-0x0199 |
| func-2 | bbbbbbbb | 0x0200-0x0219 |
| func-3 | cccccccc | 0x0300-0x0349 |
| ... | ... | ... |

FIG. 5

| INSPECTION REGION / TIMING | API AND FUNCTION USING I/O | FUNCTION USED BY API | FUNCTION |
|---|---|---|---|
| I/O CALL | PATTERN A | PATTERN B | PATTERN C |
| API CALL | - | PATTERN D | PATTERN E |
| FUNCTION CALL | - | - | PATTERN F |

FIG. 10A

| I/O-ID | Message | API-ID |
|---|---|---|
| I/O-1 | READ | API-1 |
| I/O-1 | WRITE | API-2 |
| I/O-2 | * | API-1 |
| I/O-3 | * | API-3 |
| ... | ... | ... |

FIG. 10B

| API-ID | func-ID |
|---|---|
| API-1 | func-1 |
| API-1 | func-2 |
| API-2 | func-2 |
| API-3 | func-2 |
| API-3 | func-3 |
| ... | ... |

FIG. 10C

| API-ID | memory addr |
|---|---|
| API-1 | 0x0050-0x0099 |
| API-2 | 0x0220-0x0299 |
| API-3 | 0x0350-0x0399 |
| ... | ... |

FIG. 10D

| func-ID | memory addr |
|---|---|
| func-1 | 0x0100-0x0199 |
| func-2 | 0x0200-0x0219 |
| func-3 | 0x0300-0x0349 |
| ... | ... |

FIG. 11A

| I/O-ID | Hash value | memory addr |
|---|---|---|
| I/O-1 | zzzzzzzz | 0x0050-0x0349 |
| I/O-2 | xxxxxxxx | 0x0050-0x0219 |
| I/O-3 | ssssssss | 0x0200-0x0219, 0x0300-0x0399 |
| ... | ... | ... |

FIG. 11B

| I/O-ID | Message | Hash value | memory addr |
|---|---|---|---|
| I/O-1 | READ | xxxxxxxx | 0x0050-0x0219 |
| I/O-1 | WRITE | yyyyyyyy | 0x0200-0x0349 |
| ... | ... | ... | ... |

FIG. 11C

| I/O-ID | Message | Argument | Hash value | memory addr |
|---|---|---|---|---|
| I/O-1 | READ | True | cccccccc | 0x0050-0x0199 |
| I/O-1 | READ | False | dddddddd | 0x0050-0x0099, 0x0200-0x0219 |
| I/O-1 | WRITE | * | yyyyyyyy | 0x0200-0x0349 |
| ... | ... | ... | ... | ... |

FIG. 11D

| API-ID | Hash value | memory addr |
|---|---|---|
| API-1 | xxxxxxxx | 0x0050-0x0219 |
| API-2 | yyyyyyyy | 0x0200-0x0349 |
| API-3 | tttttttt | 0x0350-0x0399 |
| ... | ... | ... |

FIG. 11E

| func-ID | Hash value | memory addr |
|---|---|---|
| func-1 | aaaaaaaa | 0x0100-0x0199 |
| func-2 | bbbbbbbb | 0x0200-0x0219 |
| func-3 | cccccccc | 0x0300-0x0349 |
| ... | ... | ... |

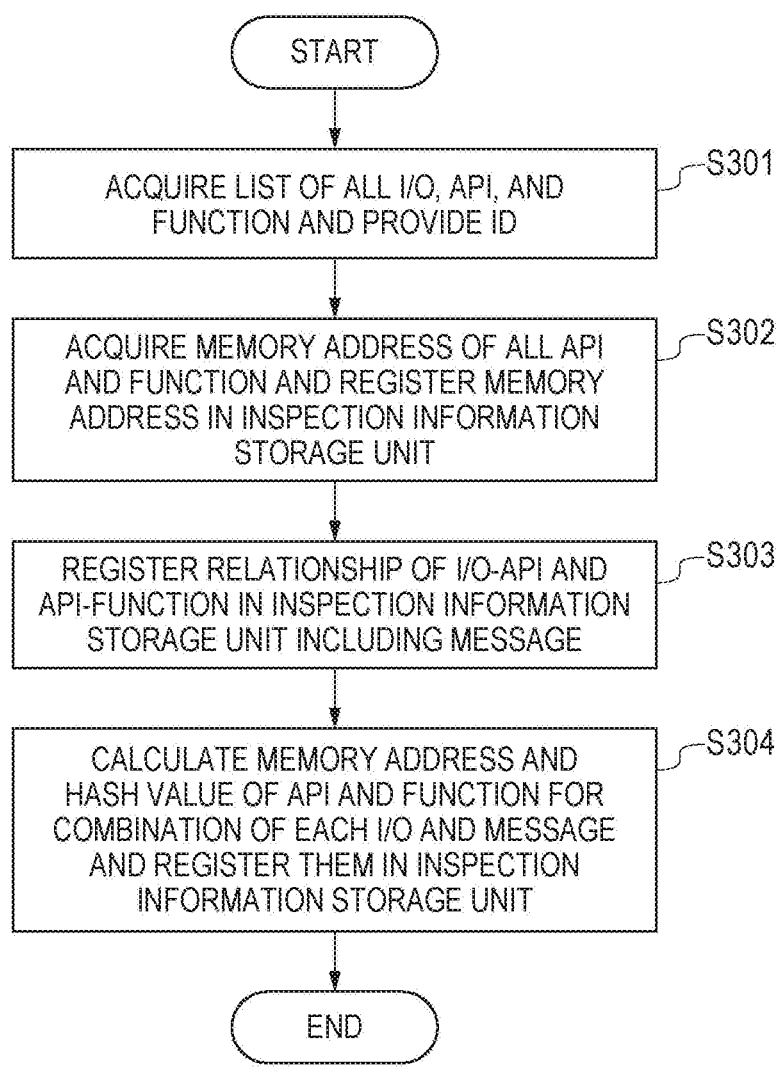

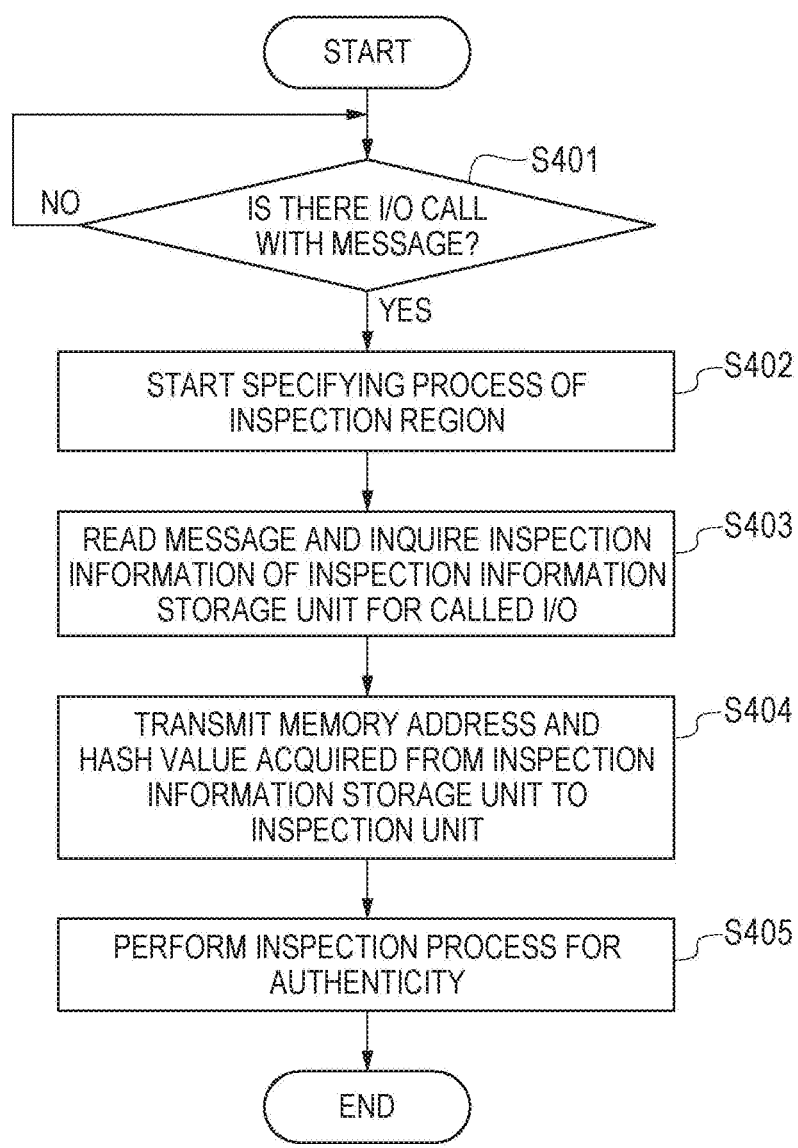

INFORMATION PROCESSING DEVICE, INFORMATION PROCESSING METHOD, AND STORAGE MEDIUM

This application is a National Stage Entry of PCT/JP2019/001641 filed on Jan. 21, 2019, which claims priority from Japanese Patent Application 2018-017006 filed on Feb. 2, 2018, the contents of all of which are incorporated herein by reference, in their entirety.

TECHNICAL FIELD

The present invention relates to an information processing device, an information processing method, and a storage medium.

BACKGROUND ART

In recent years, due to the spread of IoT devices, a security measure is required in a device such as a network camera or a smart meter having low computing capacity. For example, Patent Literature 1 discloses an information terminal that inspects whether or not there is a tampering for each program based on a hash value registered in a white list in advance.

CITATION LIST

Patent Literature

PTL 1: Japanese Patent Application Laid-open No. 2009-9372

SUMMARY OF INVENTION

Technical Problem

The information terminal disclosed in Patent Literature 1 calculates in advance a hash value on a program basis and inspects program authenticity by comparing a hash value newly calculated at the time of inspection with the hash value. Since the whole program corresponds to an inspection region, there is a problem of an inspection process requiring long time in a device having low computing capacity.

Accordingly, in view of the above problem, the present invention intends to provide an information processing device, an information processing method, and a storage medium that can reduce time for inspecting program authenticity.

Solution to Problem

According to one example aspect of the present invention, provided is an information processing device including: a storage unit that stores a first unique value calculated for each portion of a program in advance; and an inspection unit that inspects whether or not there is a tampering in the portion by newly calculating a second unique value for the portion and comparing the first unique value with the second unique value.

According to another example aspect of the present invention, provided is an information processing method including: storing, in a storage region, a first unique value calculated for each portion of a program in advance; and inspecting whether or not there is a tampering in the portion by newly calculating a second unique value for the portion and comparing the first unique value with the second unique value.

According to yet another example aspect of the present invention, provided is a storage medium storing a program that causes a computer to perform: storing, in a storage region, a first unique value calculated for each portion of a program in advance; and inspecting whether or not there is a tampering in the portion by newly calculating a second unique value for the portion and comparing the first unique value with the second unique value.

Advantageous Effects of Invention

According to the present invention, an information processing device, an information processing method, and a storage medium that can reduce time for inspecting program authenticity can be provided.

BRIEF DESCRIPTION OF DRAWINGS

FIG. 2A is a diagram illustrating a specific example of a table stored by an inspection information storage unit in the first example embodiment.

FIG. 2B is a diagram illustrating a specific example of a table stored by the inspection information storage unit in the first example embodiment.

FIG. 2C is a diagram illustrating a specific example of a table stored by the inspection information storage unit in the first example embodiment.

FIG. 2D is a diagram illustrating a specific example of a table stored by the inspection information storage unit in the first example embodiment.

FIG. 4A is a diagram illustrating a specific example of a reference table registered in the inspection information storage unit by a registration unit in the first example embodiment.

FIG. 4B is a diagram illustrating a specific example of a reference table registered in the inspection information storage unit by a registration unit in the first example embodiment.

FIG. 4C is a diagram illustrating a specific example of a reference table registered in the inspection information storage unit by a registration unit in the first example embodiment.

FIG. 5 is a diagram illustrating a correspondence example between execution timing and an inspection region of an inspection region specifying unit in the first example embodiment.

FIG. 10A is a diagram illustrating a specific example of a table stored by an inspection information storage unit in a second example embodiment.

FIG. 10B is a diagram illustrating a specific example of a table stored by the inspection information storage unit in the second example embodiment.

FIG. 10C is a diagram illustrating a specific example of a table stored by the inspection information storage unit in the second example embodiment.

FIG. 10D is a diagram illustrating a specific example of a table stored by the inspection information storage unit in the second example embodiment.

FIG. 11A is a diagram illustrating a specific example of a reference table registered in the inspection information storage unit by the registration unit in the second example embodiment.

FIG. 11B is a diagram illustrating a specific example of a reference table registered in the inspection information storage unit by the registration unit in the second example embodiment.

FIG. 11C is a diagram illustrating a specific example of a reference table registered in the inspection information storage unit by the registration unit in the second example embodiment.

FIG. 11D is a diagram illustrating a specific example of a reference table registered in the inspection information storage unit by the registration unit in the second example embodiment.

FIG. 11E is a diagram illustrating a specific example of a reference table registered in the inspection information storage unit by the registration unit in the second example embodiment.

FIG. 12 is a flowchart illustrating a registration process of inspection information performed by the information processing device according to the second example embodiment.

FIG. 13 is a flowchart illustrating an inspection process performed by the information processing device according to the second example embodiment.

DESCRIPTION OF EMBODIMENTS

Figure 1:
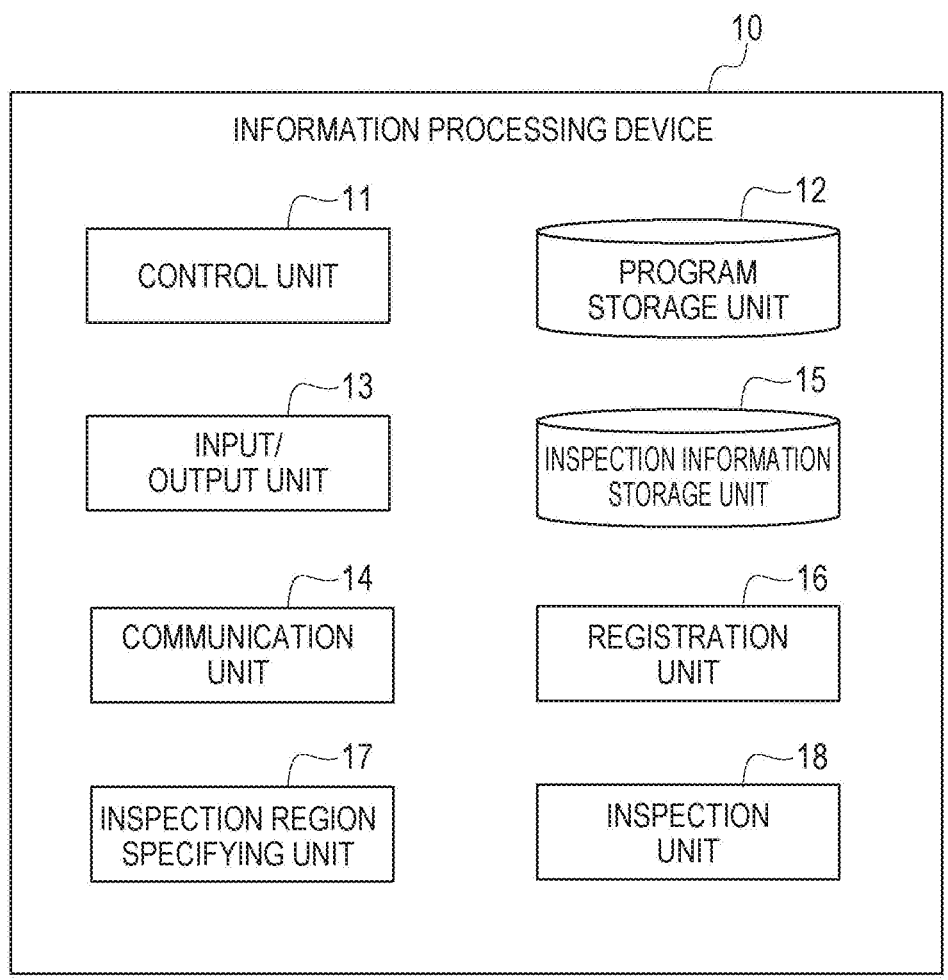
FIG. 1 is a block diagram illustrating a function of an information processing device according to a first example embodiment.

Example embodiments of the present invention will be described below with reference to the drawings. Note that, in the drawings described below, components having the same function or corresponding functions are labeled with the same reference symbols, and the duplicated description thereof will be omitted.

First Example Embodiment

FIG. 1 is a block diagram illustrating a function of an information processing device 10 according to the present example embodiment. The information processing device 10 has a control unit 11, a program storage unit 12, an input/output unit 13, a communication unit 14, an inspection information storage unit 15, a registration unit 16, an inspection region specifying unit 17, and an inspection unit 18.

The control unit 11 is a control device that performs control and calculation processes of the overall information processing device 10. The program storage unit 12 is a storage device that stores various programs executed in the control unit 11. The input/output unit 13 is an input/output interface and an input/output device that input data, a signal, or the like to the information processing device 10 and output a process result in the information processing device 10. Note that, in the present example embodiment, a call of the input/output unit 13 (execution request) is referred to as an I/O call. The communication unit 14 is a communication device that communicates with a device of an access point via a network (not illustrated) such as the Internet.

The inspection information storage unit 15 stores, on a portion of a program basis, inspection information in which a caller of the portion, a memory address of the portion in the program storage unit 12, and a unique value (hereinafter, referred to as a first unique value) calculated in advance for a portion are associated with each other. Here, in the present example embodiment, a portion of a program represents application programming interface (API) and various functions that realize a function of the API, respectively.

FIG. 2A to FIG. 2D are diagrams illustrating a specific example of tables stored by an inspection information storage unit 15 in the present example embodiment. FIG. 2A illustrates call relationships between I/O and API, and FIG. 2B illustrates call relationships between API and a function (func). In the present example embodiment, each of API-1 and API-2 is API that uses I/O-1. Thus, in FIG. 2A, API-1 and API-2 are called by I/O-1. FIG. 2B illustrates that two functions func-1 and func-2 are called by API-1. FIG. 2C and FIG. 2D illustrate that a memory address (memory addr) in the program storage unit 12, such as binary data or a source code of API and a function (func), is stored for each identifier of API and each identifier of a function (func). All the tables of FIG. 2A to FIG. 2D are registered by the registration unit 16 described later.

Figure 3:
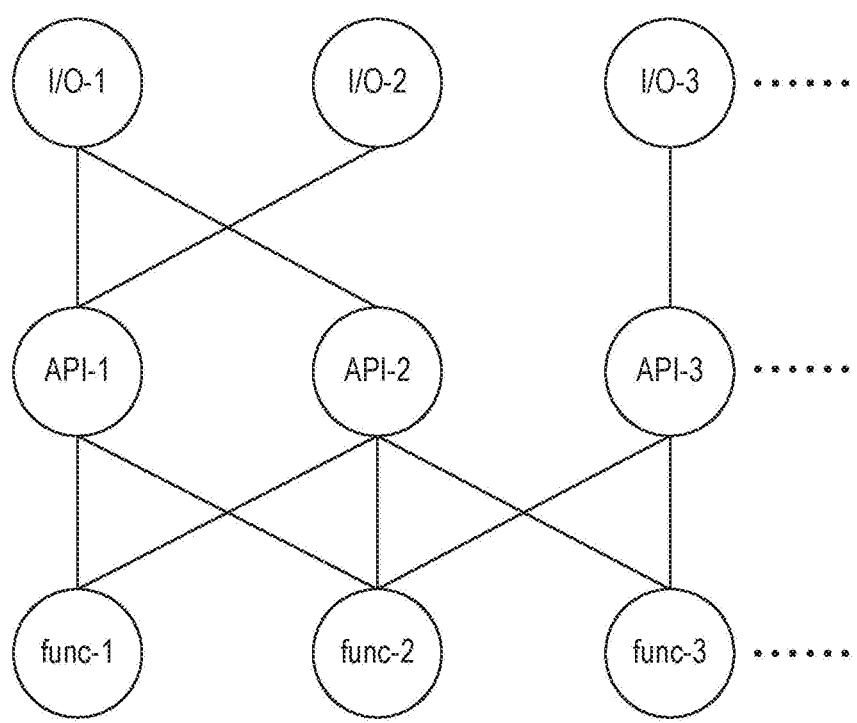
FIG. 3 is a schematic diagram illustrating call relationships of I/O, API, and functions in the first example embodiment.

FIG. 3 is a schematic diagram illustrating call relationships of I/O, API, and functions in the present example embodiment. FIG. 3 is a schematic view of call relationships from data of the tables illustrated in FIG. 2A to FIG. 2D. According to FIG. 3, for example, it is understood that when I/O-2 is called, a portion of a program directly or indirectly related to I/O-2 is only API-1, func-1, and func-2. Similarly, it is understood that when I/O-3 is called, a portion of a program directly or indirectly related to I/O-3 is API-3, func-2, and func-3.

The registration unit 16 analyzes a program stored in the program storage unit 12 and extracts a call relationship between portions forming a program. The registration unit 16 further acquires memory addresses of all the portions related to a caller. The registration unit 16 further calculates a unique value (first unique value) such as a hash value from an entity of a portion of a program stored in the memory address (for example, a source code or binary data), for example, creates a reference table associated with the caller, a hash value, and a memory address, and registers the reference table in the inspection information storage unit 15. Note that an index value which can be calculated by an entity of a portion of a program and by which whether or not there is a tampering can be checked can be used as the unique value corresponding to a portion of a program other than a hash value, for example, and a value of an error correction code can be used.

FIG. 4A to FIG. 4C are diagrams illustrating specific examples of reference tables registered in the inspection information storage unit 15 by the registration unit 16 in the present example embodiment. The reference table of FIG. 4A associates an identifier of I/O (I/O-ID), a hash value (Hash Value), and a memory address (memory addr) with each other. For example, in a case of I/O-1, a memory address is stored as "0x0050-0x0349". As illustrated in FIG. 2C and FIG. 2D, the above memory address is aggregation of a memory address "0x0050-0x0099" of API-1, a memory address "0x0100-0x0199" of func-1, a memory address "0x0200-0x0219" of func-2, a memory address "0x0220-0x0299" of API-2, and a memory address "0x0300-0x0349" of func-3. Further, a hash value "zzzzzzzz" associated with I/O-1 represents a unique value calculated from API-1, func-1, func-2, API-2, and func-3. The reference tables of FIG. 4B and FIG. 4C further associate a memory address with a hash value for an identifier of API (API-ID) and an identifier of a function (func-ID) instead of an identifier of I/O (I/O-ID).

The inspection region specifying unit 17 specifies, as an inspection region, a memory address acquired from inspection information in the inspection information storage unit 15 based on the caller. Specifically, the inspection region specifying unit 17 references the reference tables illustrated in FIG. 4A to FIG. 4C described above by using an identifier of a caller as a key and determines the acquired memory address as an inspection region. Note that there are various schemes as a calling scheme of the inspection region specifying unit 17. For example, there are a scheme (1) in which a function of monitoring a program or I/O (input/output unit 13) is implemented in the inspection region specifying unit 17, a scheme (2) in which a call command of the inspection region specifying unit 17 is embedded on a program or I/O side, and the like. In the present example embodiment, the scheme (1) is used. That is, the inspection region specifying unit 17 is performed when a portion of a program is called from a caller.

FIG. 5 is a diagram illustrating a correspondence example between execution timings and inspection regions of the inspection region specifying unit 17 in the present example embodiment. Here, the execution timing of the inspection region specifying unit 17 is divided into three, namely, an I/O call, an API call, and a function call. Further, a caller of a portion of a program in the present example embodiment includes I/O, API that uses I/O, and a function that realizes an API function. Further, the I/O calls API, the API calls a function, and the function calls the same or a different function. Thus, as illustrated in FIG. 5, combination patterns of execution timings and inspection regions are six patterns of pattern A to pattern F.

The inspection unit 18 newly calculates a unique value (hereinafter, referred to as a second unique value) for a portion of a program related to an inspection region and inspects whether or not there is a tampering in the inspection region by comparing the first unique value with the second unique value in a portion of a program related to the inspection region. Specifically, the inspection unit 18 determines that a portion of a program stored in the inspection region is falsified when a hash value (first unique value) stored in the inspection information storage unit 15 and a newly calculated hash value (second unique value) are different from each other.

Figure 6:
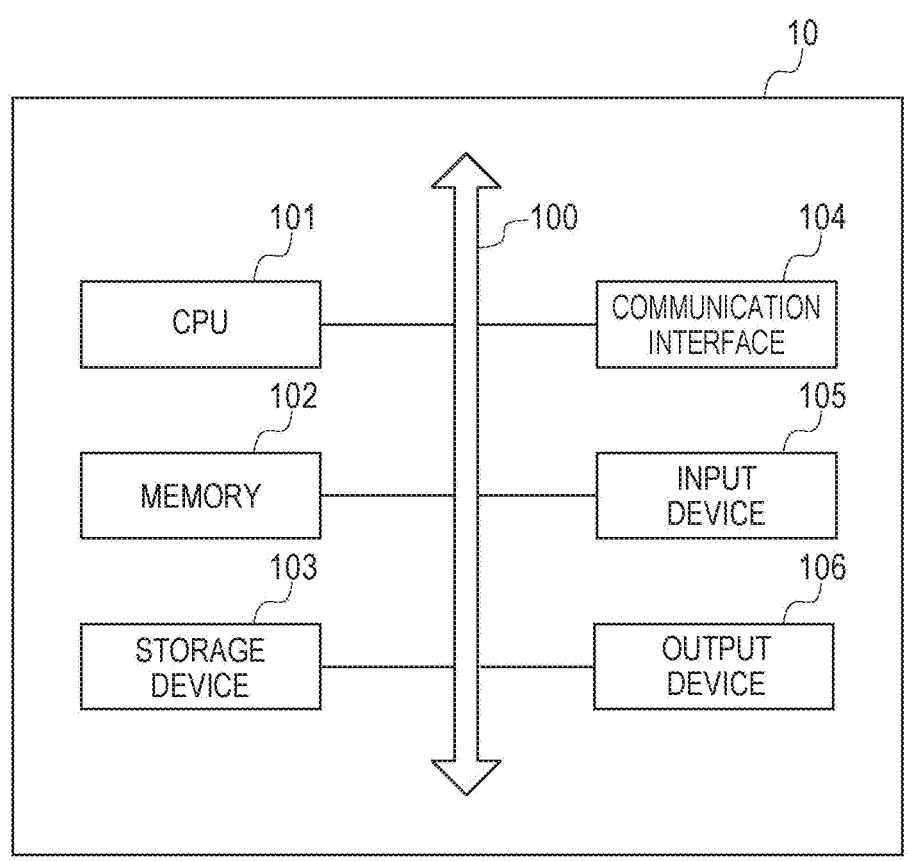
FIG. 6 is a block diagram illustrating a hardware configuration example of the information processing device according to the first example embodiment.

FIG. 6 is a block diagram illustrating a hardware configuration example of the information processing device 10 according to the present example embodiment. The information processing device 1 has a central processing unit (CPU) 101, a memory 102, a storage device 103, a communication interface 104, an input device 105, and an output device 106. Each component is connected to a common bus 100.

The CPU 101 is a control unit 11 that performs overall control and calculation processes of the information processing device 10 by loading a program stored in the storage device 103 on the memory 102 and executing the program. Further, the CPU 101 stores data of a process result in the storage device 103 and externally transmits the data of the process result via the communication interface 104.

The memory 102 is a storage region that temporarily stores data being processed by the CPU 101 or data read from the storage device 103 and includes a random access memory (RAM) or the like.

The storage device 103 stores a program executed by the CPU 101, data of a process result obtained by the program, or the like. The storage device 103 includes a read only memory (ROM) dedicated to reading, a hard disk drive or a flash memory that is readable and writable, or the like. Further, the storage device 103 may include a computer readable portable storage medium such as a CD-ROM.

The communication interface 104 is a communication unit 14 that transmits and receives data and is configured to be able to execute at least one of the communication schemes of wired communication and wireless communication. The communication interface 104 includes a processor, an electric circuit, an antenna, a connection terminal, or the like required for the above communication scheme. The communication interface 104 uses the communication scheme in accordance with a signal from the CPU 101 for communication.

The input device 105 includes a keyboard, a mouse, a switch, or the like that accepts entry from a user and transmits the input content to the CPU 101 as a signal. A touchscreen in which the input device 105 and a display device (not illustrated) are integrated may be used. The output device 106 is a device that outputs processing information in accordance with a command from the CPU 101 and corresponds to a display device that outputs image information, a speaker (not illustrated) that outputs audio information, or the like. Further, as an I/O interface used for a connection to the input device 105 and the output device 106, universal asynchronous receiver/transmitter (UART), the Ethernet (registered trademark), general-purpose input/output (GPIO), joint test action group (JTAG), or the like may be used.

Note that the information processing device 10 is not limited to the hardware configuration illustrated in FIG. 6 and may further have other devices. The information processing device 10 may be formed of one or a plurality of devices or may be formed integrally with another device. Further, the information processing device 10 may be connected to another device, and at least a portion of a process performed by the information processing device 10 in the present example embodiment may be performed by such another device.

Figure 7:
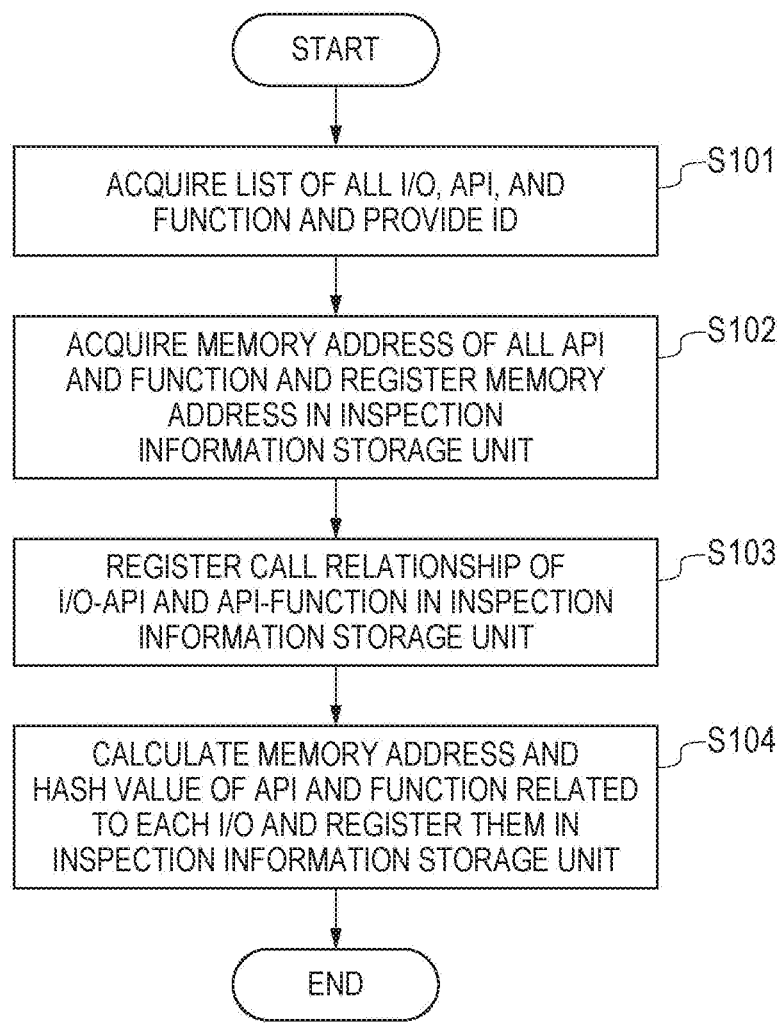
FIG. 7 is a flowchart illustrating a registration process of inspection information performed by the information processing device according to the first example embodiment.

Next, operation of the information processing device 10 according to the present example embodiment will be described with reference to FIG. 7 to FIG. 9. FIG. 7 is a flowchart illustrating a registration process of inspection information performed by the information processing device 10 according to the present example embodiment. The process is performed by the CPU 101 as the registration unit 16.

First, the registration unit 16 analyzes a source code or the like of a program, acquires a list of all the I/O, the API, and the functions, and provides an ID thereto (step S101). Specifically, a call graph that represents a call relationship of functions by using a source code is created, and thereby the relationship can be analyzed. Further, when there is no source code, the relationship can be analyzed based on a flow graph created by static analysis for a binary file or a performance trace of software by dynamic analysis.

Next, the registration unit 16 acquires memory addresses of all the API and the functions and registers the memory addresses in the inspection information storage unit 15 in association with an ID (step S102). Specifically, the tables as illustrated in FIG. 2C and FIG. 2D are created and registered in the inspection information storage unit 15.

Next, the registration unit 16 acquires call relationships between I/O and API and between API and a function and registers the call relationships in the inspection information storage unit 15 (step S103). Specifically, the tables as illustrated in FIG. 2A and FIG. 2B are created and registered in the inspection information storage unit 15.

Further, the registration unit 16 calculates a memory address and a hash value of API related to each I/O and a function based on call relationships as illustrated in FIG. 3 and registers a correspondence relationship with an identifier of I/O as inspection information in the inspection information storage unit 15 (step S104). Note that, for each API and each function, a memory address and a hash value are calculated in the same scheme and registered as inspection information in the inspection information storage unit 15. Specifically, as inspection information, the reference tables as illustrated in FIG. 4A to FIG. 4C are created and registered in the inspection information storage unit 15.

Figure 8:
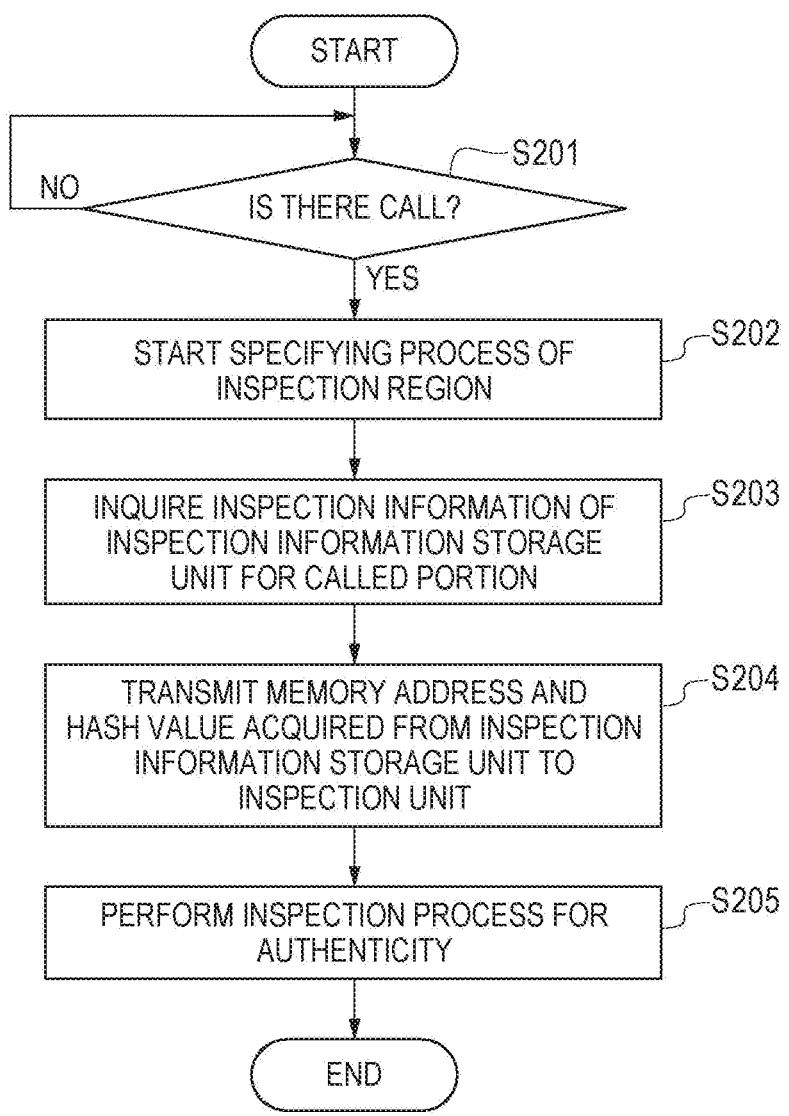
FIG. 8 is a flowchart illustrating an inspection process performed by the information processing device according to the first example embodiment.

FIG. 8 is a flowchart illustrating an inspection process performed by the information processing device 10 according to the present example embodiment. The process is performed by the CPU 101 as the inspection region specifying unit 17 and the inspection unit 18 when the process illustrated in FIG. 7 is completed.

First, the inspection region specifying unit 17 determines whether or not there is a call according to a portion of a program (an I/O call, an API call, a function call) (step S201). Here, if it is determined that there is a call (step S201, YES), the inspection region specifying unit 17 starts a specifying process of an inspection region (step S202) and proceeds to a process of step S203. On the other hand, if it is determined that there is no call (step S201, NO), the inspection region specifying unit 17 repeats the process of step S201.

In step S203, the inspection region specifying unit 17 inquires inspection information of the inspection information storage unit 15 for the called I/O or the portion of the program.

Next, the inspection region specifying unit 17 acquires and transmits a memory address of a portion of a program and a hash value, which is obtained when the above portion is in an authentic state, from the inspection information storage unit 15 to the inspection unit 18 (step S204). The information on a memory address corresponds to the inspection region specified by the inspection region specifying unit 17.

Figure 9:
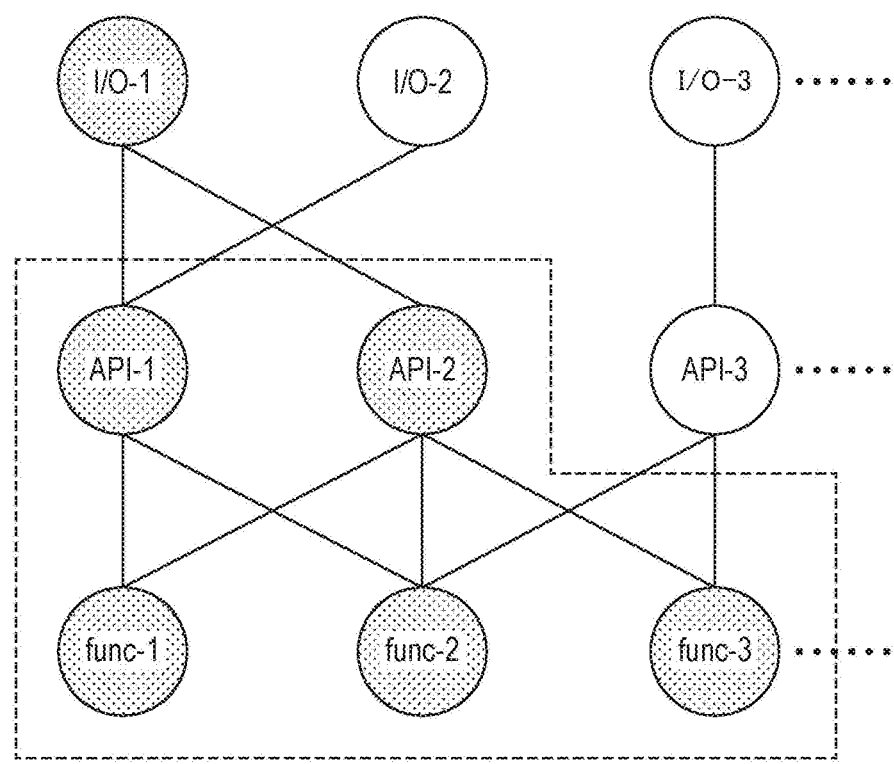
FIG. 9 is a schematic diagram illustrating a specific example of an inspection range in an inspection unit in the first example embodiment.

FIG. 9 is a schematic diagram illustrating a specific example of an inspection range in the inspection unit 18 in the present example embodiment. Here, when there is an I/O call for I/O-1, it is indicated that API-1, API-2, func-1, func-2, and func-3 directly and indirectly related to I/O-1 are included in an inspection range in the inspection unit 18 (the dashed-line part in the drawing).

Further, the inspection unit 18 performs an inspection process for authenticity of a portion of a program according to an inspection region based on the memory address and the hash value transmitted from the inspection region specifying unit 17 (step S205) and ends the process.

As described above, according to the information processing device 10 of the present example embodiment, the first unique value calculated in advance is stored in the inspection information storage unit 15 for each portion of a program. Thus, by merely comparing the second unique value newly calculated for the same portion with the first unique value, it is possible to inspect whether or not there is a tampering of the above portion. Further, according to the information processing device 10, only the portion of a program that is in a predetermined call relationship with a caller can be specified, and an inspection region can be narrowed down. Thus, compared to the case where the whole program is an inspection region, time required for an inspection process can be significantly reduced. Further, a security measure can be performed when the information processing device 10 is a device having low computing capacity.

Second Example Embodiment

The information processing device 10 according to the present example embodiment will be described below. Note that references common to the references provided in the drawings of the first example embodiment specify the same object. Accordingly, description of features common to the first example embodiment will be omitted, and different features will be described in detail.

In the present example embodiment, the inspection information storage unit 15 defines inspection information in association with an identifier of API that is a call destination for a combination of an identifier of I/O and a message input at the time of a call from the I/O. Further, the inspection region specifying unit 17 references the inspection information storage unit 15 based on the combination of the identifier of I/O and the message and specifies the inspection region.

FIG. 10A to FIG. 10D are diagrams illustrating specific examples of tables stored by the inspection information storage unit 15 in the present example embodiment. In FIG. 10A, unlike the case of FIG. 2A described above, a call relationship between I/O and API is defined including a message (message) input when I/O is called. Specifically, it is represented that API-1 is called when "READ" is input as a message when I/O of I/O-1 is called, and API-2 is called when "WRITE" is input. Note that, in the case of I/O-2, the symbol "*" in the message field indicates that API called by a message when I/O is called is not changed, a message is unable to be identified, or a message is not input. FIG. 10B to FIG. 10D are the same as FIG. 2B to FIG. 2D described above.

FIG. 11A to FIG. 11E are diagrams illustrating specific examples of reference tables registered in the inspection information storage unit 15 by the registration unit 16 in the present example embodiment. FIG. 11A, FIG. 11D, and FIG. 11E are the same as FIG. 4A to FIG. 4C described above. The tables are referenced when a message is unable to be identified when I/O is called or the like. On the other hand, FIG. 11B and FIG. 11C are tables referenced when a message is input when I/O is called.

The reference table of FIG. 11B associates a combination of an identifier of I/O (I/O-ID) and a message (message) with a hash value (Hash Value) and a memory address (memory addr). For example, a memory address is "0x0050-0x0219" for a combination of I/O-1 and a message "READ". As illustrated in FIG. 10C and FIG. 10D, the above memory address is aggregation of a memory address "0x0050-0x0099" of API-1, a memory address "0x0100-0x0199" of func-1, and a memory address "0x0200-0x0219" of func-2. Further, a hash value "xxxxxxxx" associated with a combination of I/O-1 and a message "READ" represents a unique value calculated from API-1, func-1, and func-2. That is, unlike the case of FIG. 4, a memory address "0x0220-0x0299" of API-2 and a memory address "0x0300-0x0349" of func-3 has been removed from the inspection region.

The reference table of FIG. 11C associates a hash value (Hash Value) and a memory address (memory addr) with a combination of values of an identifier of I/O (I/O-ID), a message (message), and an argument (Argument) passed to a function when API calls a function. For example, when an I/O-ID is "I/O-1", a message is "READ", and an argument is "True", a memory address "0x0100-0x0199" of "func-1" is an inspection region. When an I/O-ID is "I/O-1", a message is "READ", and an argument is "False", a memory address "0x0050-0x0099" of API-1 and a memory address "0x0200-0x0219" of func-2 are inspection regions.

Next, the operation of the information processing device 10 according to the present example embodiment will be described with reference to FIG. 12 to FIG. 14. FIG. 12 is a flowchart illustrating a registration process of inspection information performed by the information processing device 10 according to the present example embodiment. The process is performed by the CPU 101 as the registration unit 16.

First, the registration unit 16 analyzes a source code or the like of a program, acquires a list of all the I/O, all the API, and all the functions, and provides an ID thereto (step S301). Note that, in the case of taking a message or an argument into consideration, a branching condition related to a call and a relationship of a message or an argument are extracted.

Next, the registration unit 16 acquires memory addresses of all the API and all the functions and registers the memory address in the inspection information storage unit 15 in association with an ID (step S302). Specifically, the tables as illustrated in FIG. 10C and FIG. 10D are created and registered in the inspection information storage unit 15.

Next, the registration unit 16 acquires call relationships between I/O and API and between API and a function and registers the acquired information including a message in the inspection information storage unit 15 (step S303). Specifically, the tables as illustrated in FIG. 10A and FIG. 10B are created and registered in the inspection information storage unit 15.

Further, the registration unit 16 calculates a memory address and a hash value of API and a function for a combination of each I/O and a message and registers a correspondence relationship with an identifier of I/O as inspection information in the inspection information storage unit 15 (step S304). Note that, for each API and each function, a memory address and a hash value are calculated in the same scheme and registered as inspection information in the inspection information storage unit 15. Specifically, as inspection information, the reference tables as illustrated in FIG. 11A to FIG. 11E are created and registered in the inspection information storage unit 15.

FIG. 13 is a flowchart illustrating an inspection process performed by the information processing device 10 according to the present example embodiment. The process is performed by the CPU 101 as the inspection region specifying unit 17 and the inspection unit 18 when the process illustrated in FIG. 12 is completed. Note that, since a message is input when I/O is called, a case where a message is input when I/O is called will be described below.

First, the inspection region specifying unit 17 determines whether or not there is an I/O call with a message (step S401). Here, if it is determined that there is an I/O call with a message (step S401, YES), the inspection region specifying unit 17 starts a specifying process of an inspection region (step S402) and proceeds to a process of step S403. On the other hand, if it is determined that there is no I/O call with a message (step S401, NO), the inspection region specifying unit 17 repeats the process of step S401.

In step S403, the inspection region specifying unit 17 reads a message and inquires inspection information of the inspection information storage unit 15 for a combination of the called I/O and the message.

Next, the inspection region specifying unit 17 acquires and transmits a memory address of a portion of a program and a hash value, which is obtained when the above portion is in an authentic state, from the inspection information storage unit 15 to the inspection unit 18 (step S404). The information on a memory address corresponds to the inspection region specified by the inspection region specifying unit 17.

Figure 14:
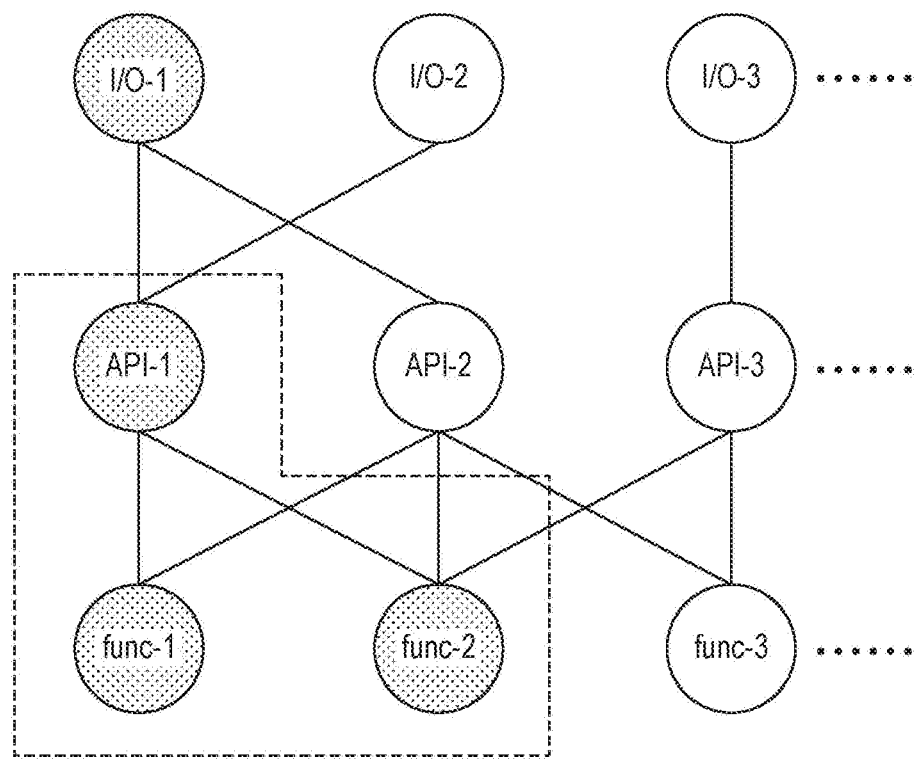
FIG. 14 is a schematic diagram illustrating a specific example of an inspection range in an inspection unit in the second example embodiment.

FIG. 14 is a schematic diagram illustrating a specific example of an inspection range in the inspection unit 18 in the present example embodiment. Here, when there is an I/O call with a message "READ" for I/O-1, it is indicated that API-1, func-1, and func-2 directly and indirectly related to I/O-1 are included in an inspection range in the inspection unit 18 (the dashed-line part in the drawing). According to FIG. 14, it is understood that the inspection range is more limited compared to the case of FIG. 9 described above.

Further, the inspection unit 18 performs an inspection process for authenticity of a portion of a program according to an inspection region based on a memory address and a hash value transmitted from the inspection region specifying unit 17 (step S405) and ends the process.

As described above, according to the information processing device 10 of the present example embodiment, since an inspection region is limited based on a combination of an identifier of a caller of a portion of a program and a message, processing time for an inspection process can be further reduced.

Third Example Embodiment

An information processing device 30 according to the present example embodiment will be described below. Note that references common to the references provided in the drawings of the first example embodiment specify the same object. Accordingly, description of features common to the first example embodiment will be omitted, and different features will be described in detail.

Figure 15:
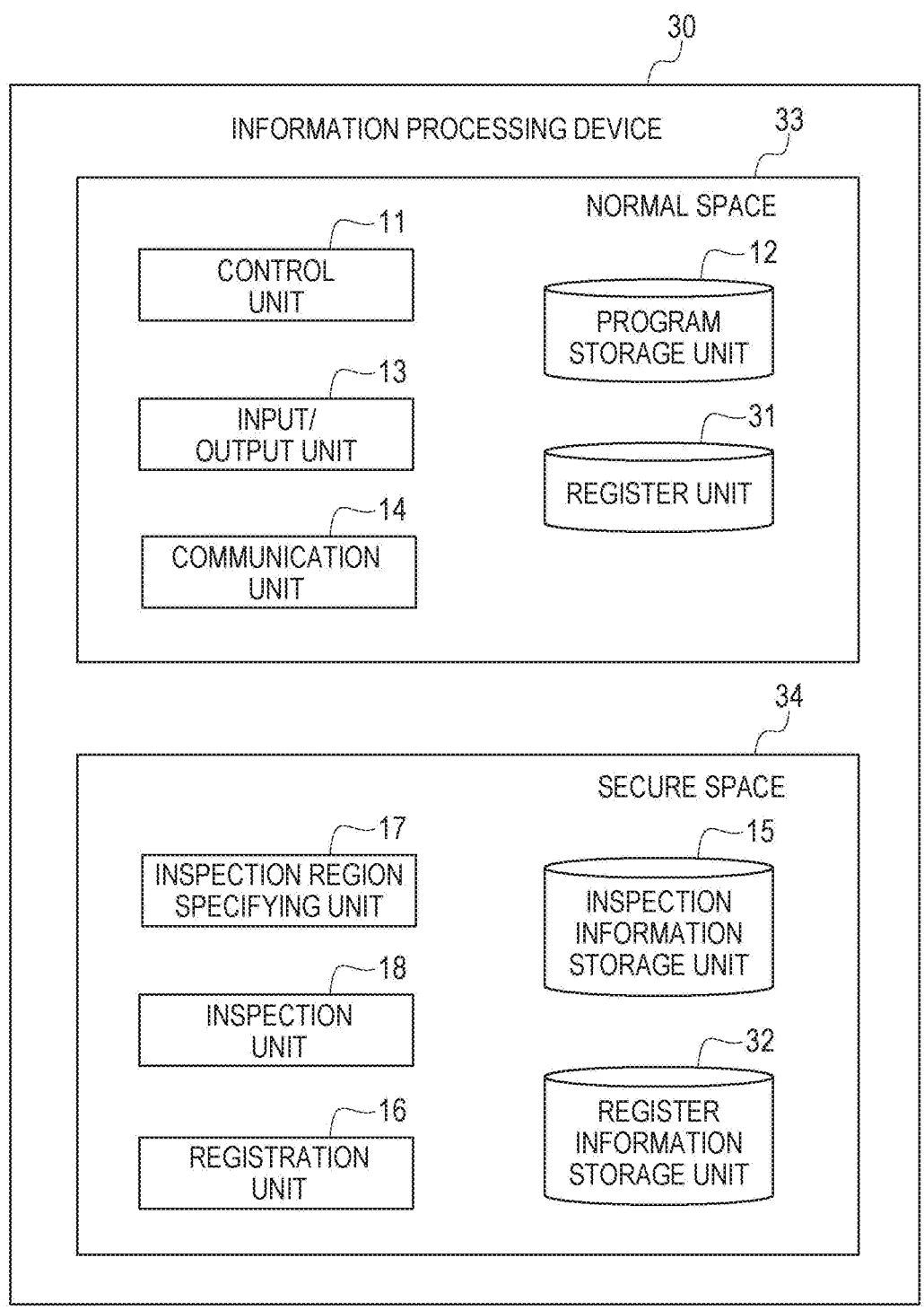
FIG. 15 is a block diagram illustrating a function of an information processing device according to a third example embodiment.

FIG. 15 is a block diagram illustrating a function of the information processing device 30 according to the present example embodiment. The information processing device 30 further has a register unit 31 and a register information storage unit 32. The register unit 31 stores a first caller that has called the inspection region specifying unit 17. On the other hand, the register information storage unit 32 stores a second caller (authentic caller) in advance that correctly calls the inspection region specifying unit 17. The information processing device 30 further has a normal space 33 and a secure space 34 in which access from the normal space 33 side is restricted. The secure space 34 is constructed by using trusted execution environment (TEE) of Trust Zone, for example.

In the normal space 33, the register unit 31, the control unit 11, the program storage unit 12, the input/output unit 13, and the communication unit 14 are arranged. On the other hand, the register information storage unit 32, the inspection information storage unit 15, the registration unit 16, the inspection region specifying unit 17, and the inspection unit 18 are arranged in the secure space 34.

Further, there are two schemes below for calling the inspection region specifying unit 17 in the present example embodiment, for example.
(1) When a command that is a trigger is embedded in a program of the normal space 33, the program calls the inspection region specifying unit 17.
(2) When the inspection region specifying unit 17 monitors the program storage unit 12 or I/O (input/output unit 13), the inspection region specifying unit 17 operates when a predetermined inspection timing arrives. In accordance with the operation of the inspection region specifying unit 17, the inspection unit 18 inspects whether or not there is a tampering of a call command related to the inspection region specifying unit 17 by comparing the first caller (register unit 31) with the second caller (register information storage unit 32).

Figure 16:
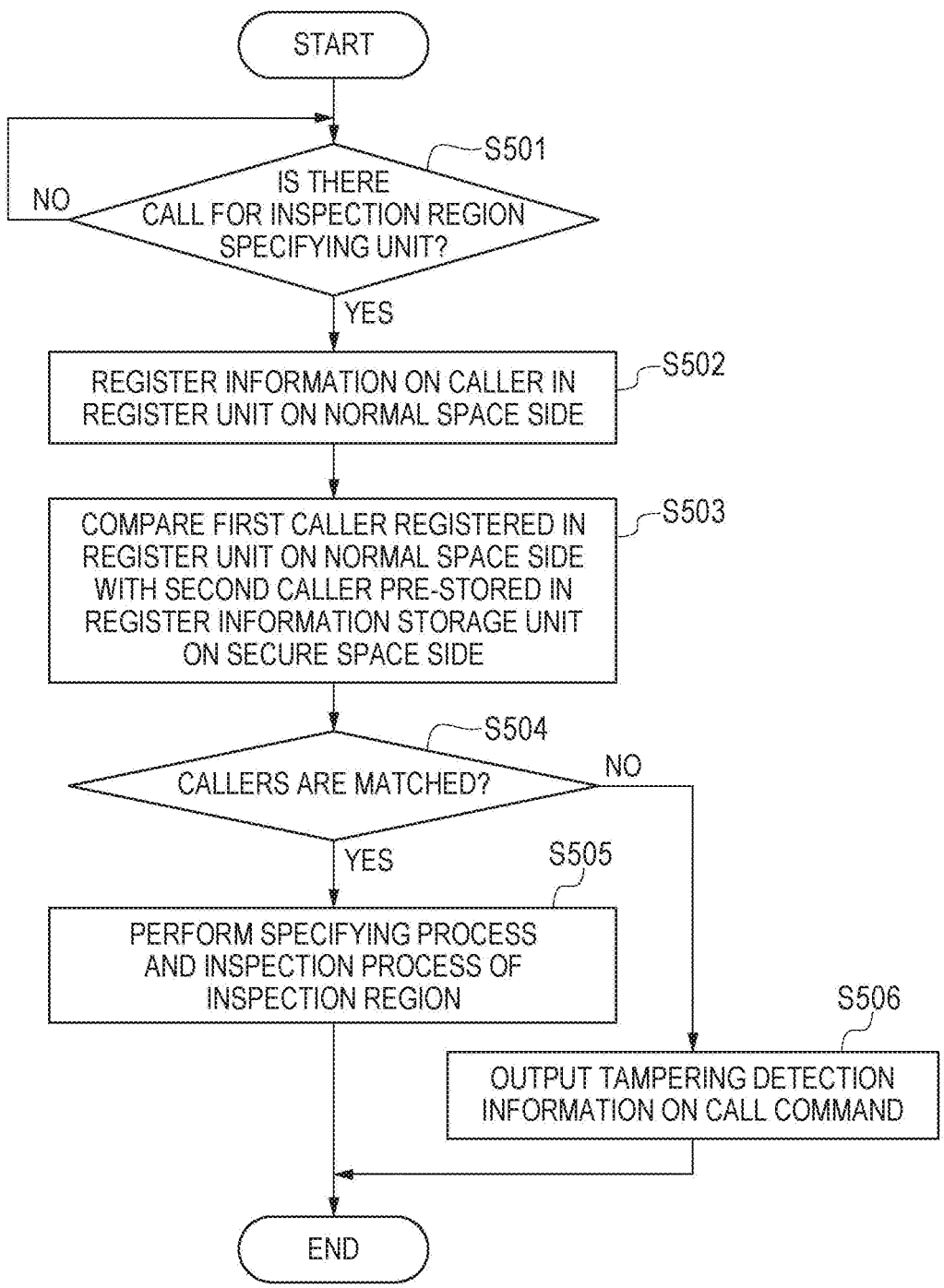
FIG. 16 is a flowchart illustrating an inspection process performed by the information processing device according to the third example embodiment.

Next, the operation of the information processing device 30 according to the present example embodiment will be described with reference to FIG. 16. FIG. 16 is a flowchart illustrating an inspection process performed by the information processing device 30 according to the present example embodiment. The process is performed by the CPU 101 as the inspection region specifying unit 17 and the inspection unit 18 when the process illustrated in FIG. 12 is completed.

First, the inspection region specifying unit 17 determines whether or not there is a call (step S501). Here, if it is determined that there is a call (step S501, YES), the inspection region specifying unit 17 acquires information on the caller and registers the information on the caller in the register unit 31 on the normal space 33 side (step S502) and proceeds to a process of step S503. On the other hand, if it is determined that there is no call (step S501, NO), the inspection region specifying unit 17 repeats the process of step S501.

In step S503, the inspection unit 18 compares the first caller registered in the register unit 31 on the normal space 33 side with the second caller pre-stored in the register information storage unit 32 on the secure space 34 side.

Next, the inspection unit 18 determines whether or not the callers are matched (step S504). Here, if the inspection unit 18 determines that the callers are matched (step S504, YES), a specifying process of an inspection region by the inspection region specifying unit 17 and an inspection process by the inspection unit 18 are performed (step S505), and the process ends. The process of step S505 is the same as the process of FIG. 8 described in the first example embodiment. On the other hand, if the inspection unit 18 determines that the callers are not matched (step S504, NO), tampering detection information on the call command is output (step S506), and the process ends.

As described above, according to the information processing device 30 according to the present example embodiment, by comparing a caller at the time of authentic call with a caller at the time of an actual call, it is possible to detect a tampering of a call command.

Fourth Example Embodiment

Figure 17:
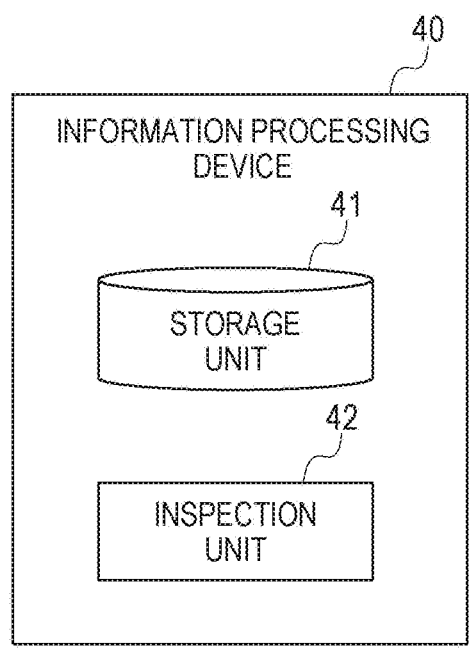
FIG. 17 is a block diagram illustrating a function of an information processing device according to a fourth example embodiment.

An information processing device 40 according to the present example embodiment will be described below. FIG. 17 is a block diagram illustrating a function of the information processing device 40 according to the present example embodiment.

As illustrated in FIG. 17, the information processing device 40 has a storage unit 41 that stores a first unique value calculated for each portion of a program in advance and an inspection unit 42 that inspects whether or not there is a tampering in a portion by newly calculating a second unique value for the portion and comparing the first unique value with the second unique value.

As described above, according to the information processing device 40 of the present example embodiment, time for inspecting program authenticity can be reduced.

Modified Example Embodiment

While the present invention has been described with reference to the above example embodiments, the present invention is not limited to the example embodiments described above. Various modifications that may be understood by those skilled in the art can be made to the feature and the details of the present invention within the scope not departing from the spirit of the present invention. For example, it should be appreciated that an example embodiment in which a part of the configuration of any of the example embodiments is added to another example embodiment or an example embodiment in which a part of the configuration of any of the example embodiments is replaced with a part of the configuration of another example embodiment is one of the example embodiments to which the present invention may be applied.

Further, although the inspection information in which a hash value and a memory address are associated with a combination of an identifier of I/O, a message, and an argument has been described in the above second example embodiment, a hash value and a memory address may be associated with another combination. For example, the inspection information storage unit 15 may store inspection information in which the first unique value is associated with a combination of a caller and an argument input when a portion of a program is called. The inspection region specifying unit 17 may be further configured to specify a portion to be an inspection region based on the combination of the caller and the argument.

Further, the inspection information storage unit 15 may store inspection information in which the first unique value is associated with a combination of a caller and a value of a time variable. The inspection region specifying unit 17 may be further configured to switch the portion to be the inspection region when the elapsed time of a process executed by the portion of the program reaches the value of the time variable. In such a case, it is possible to perform an inspection process at a timing of proceeding to the next control in accordance with elapsed time.

Figure 18:
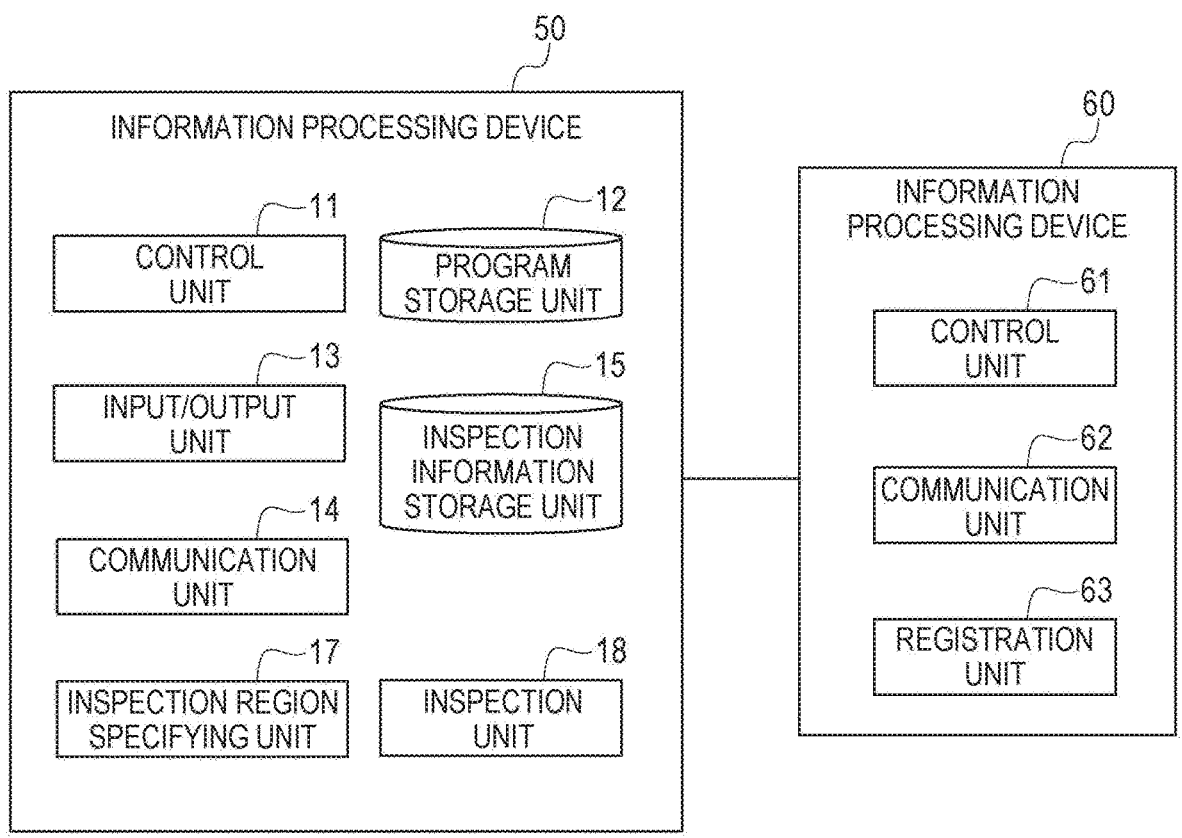
FIG. 18 is a block diagram illustrating a function of an information processing device according to a modified example embodiment.

Further, in each of the example embodiments described above, the configuration in which the information processing device has the registration unit 16 has been described. However, the process related to the registration unit 16 may be performed in another information processing device. FIG. 18 is a block diagram illustrating the function of an information processing device 50 according to a modified example embodiment. As illustrated in FIG. 18, the information processing device 50 is connected to another information processing device 60. Another information processing device 60 has a control unit 61, a communication unit 62, and a registration unit 63 corresponding to the control unit 11, the communication unit 14, and a registration unit 16 in each example embodiment described above, respectively. The registration unit 63 analyzes a program stored in the program storage unit 12 on the information processing device 50 side and extracts a call relationship between portions forming the program. Further, the registration unit 63 acquires a memory address of all the portions related to a caller. The registration unit 63 then calculates a unique value such as a hash value, for example, from an entity (for example, a source code or binary data) of a portion of a program stored in the memory address of interest, creates a reference table in which a caller, a hash value, and a memory address are associated with each other, and registers the reference table in the inspection information storage unit 15 on the information processing device 50 side. The specific processing method of the registration unit 63 is the same as that of FIG. 7 and FIG. 12 described above. In the general IoT devices, only the binary code is often stored in a storage region (the memory 102 or the storage device 103). However, the process of the registration unit 63 utilizes a source code, and the device requires computing capacity of compiling the source code. Therefore, according to the modified example embodiment, since the process of the registration unit 63 is performed on the external device (another information processing device 60) side having sufficient computing capacity, there is an advantage that the present invention can be applied to more IoT devices.

Further, the scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disc-read only memory (CD-ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

An information processing device comprising:

a storage unit that stores a first unique value calculated for each portion of a program in advance; and an inspection unit that inspects whether or not there is a tampering in the portion by newly calculating a second unique value for the portion and comparing the first unique value with the second unique value.

(Supplementary Note 2)

The information processing device according to supplementary note 1, wherein the storage unit stores a caller of the portion, a memory address of the portion in a storage region of the program, and the first unique value in association with each other for each the portion of the program, and the information processing device further comprising a specifying unit that specifies the portion inspected by the inspection unit based on the caller.

(Supplementary Note 3)

The information processing device according to supplementary note 2, wherein the specifying unit specifies the portion having a call relationship directly and indirectly with the caller.

(Supplementary Note 4)

The information processing device according to supplementary note 2 or 3, wherein the caller includes I/O, API that uses the I/O, and a function that realizes a function of the API, and wherein the I/O calls the API, the API calls the function, and the function calls the same or a different function as the portion.

(Supplementary Note 5)

The information processing device according to supplementary note 4, wherein the storage unit stores a combination of an identifier of the I/O and a message input at a time of a call from the I/O in association with an identifier of the API, and wherein the specifying unit references the storage unit based on a combination of an identifier of the I/O and the message and specifies the portion.

(Supplementary Note 6)

The information processing device according to any one of supplementary notes 2 to 5 further comprising:

a register unit that stores a first caller that called the specifying unit;

a register information storage unit that stores a second caller in advance that correctly calls the specifying unit;

a normal space in which the register unit is arranged; and a secure space in which the register information storage unit, the storage unit, the specifying unit, and the inspection unit are arranged and access from the normal space side is restricted, wherein the inspection unit inspects whether or not there is a tampering of a call command according to the specifying unit by comparing the first caller with the second caller.

(Supplementary Note 7)

The information processing device according to any one of supplementary notes 2 to 6, wherein the storage unit stores a combination of the caller and a value of a time variable in association with the first unique value, and wherein the specifying unit switches the portion inspected by the inspection unit when elapsed time of a process performed by the portion reaches a value of the time variable.

(Supplementary Note 8)

The information processing device according to any one of supplementary notes 2 to 6, wherein the storage unit stores, in association with the first unique value, a combination of the caller and an argument input when the portion is called, and wherein the specifying unit references the storage unit based on a combination of the caller and the argument and specifies the portion inspected by the inspection unit.

(Supplementary Note 9)

An information processing method comprising:

storing, in a storage region, a first unique value calculated for each portion of a program in advance; and inspecting whether or not there is a tampering in the portion by newly calculating a second unique value for the portion and comparing the first unique value with the second unique value.

(Supplementary Note 10)

A storage medium storing a program that causes a computer to perform:

storing, in a storage region, a first unique value calculated for each portion of a program in advance; and inspecting whether or not there is a tampering in the portion by newly calculating a second unique value for the portion and comparing the first unique value with the second unique value.

This application is based upon and claims the benefit of priority from Japanese Patent Application No. 2018-017006, filed on Feb. 2, 2018, the disclosure of which is incorporated herein in its entirety by reference.

REFERENCE SIGNS LIST 10, 30, 40, 50, 60 information processing device
11 control unit
12 program storage unit
13 input/output unit
14 communication unit
15 inspection information storage unit (storage unit)
16 registration unit
17 inspection region specifying unit (specifying unit)
18 inspection unit
31 register unit
32 register information storage unit
33 normal space
34 secure space
41 storage unit
42 inspection unit
61 control unit
62 communication unit
63 registration unit
101 CPU
102 memory
103 storage device
104 communication interface
105 input device
106 output device

What is claimed is:

1. An information processing device comprising:
a memory that stores a first unique value calculated for each portion of a program in advance, a caller of the each portion, a memory address of the each portion in a storage region of the program, the first unique value in association with each other for the each portion of the program, and a combination of the caller and a value of a time variable in association with the first unique value; and
at least one processor configured to execute one or more instructions to:
inspect whether or not there is a tampering in the each portion by newly calculating a second unique value for the each portion and comparing the first unique value with the second unique value,
specify the each portion inspected by an inspection unit based on the caller, and
switch the each portion inspected by the inspection unit when elapsed time of a process performed by the each portion reaches a value of the time variable.

2. The information processing device according to claim 1, wherein the at least one processor is further configured to specify the each portion having a call relationship directly and indirectly with the caller.

3. The information processing device according to claim 1,
wherein the caller includes I/O, API that uses the I/O, and a function that realizes a function of the API, and
wherein the I/O calls the API, the API calls the function, and the function calls a same or a different function as the each portion.

4. The information processing device according to claim 3,
wherein the memory stores a combination of an identifier of the I/O and a message input at a time of a call from the I/O in association with an identifier of the API, and
wherein the at least one processor is further configured to reference the memory based on a combination of the identifier of the I/O and the message and specifies the each portion.

5. The information processing device according to claim 1, further comprising:
a register that stores a first caller that called the information processing device;
a register information storage that stores a second caller in advance that correctly calls the information processing device;
a normal space in which the register is arranged; and
a secure space in which the register information storage, the memory, and the at least one processor, are arranged and access from the normal space side is restricted,
wherein the at least one processor is further configured to inspect whether or not there is a tampering of a call command by comparing the first caller with the second caller.

6. The information processing device according to claim 1,
wherein the memory stores, in association with the first unique value, a combination of the caller and an argument input when the each portion is called, and
wherein the at least one processor is further configured to reference the memory based on a combination of the caller and the argument and specifies the each portion inspected by the inspection unit.

7. An information processing method comprising:
storing, by at least one processor, in a storage region, a first unique value calculated for each portion of a program in advance, a caller of the each portion, a memory address of the each portion in a storage region of the program, the first unique value in association with each other for the each portion of the program, and a combination of the caller and a value of a time variable in association with the first unique value;
inspecting, by the at least one processor, whether or not there is a tampering in the each portion by newly calculating a second unique value for the each portion and comparing the first unique value with the second unique value,
specifying, by the at least one processor, the each portion inspected by an inspection unit based on the caller; and
switching, by the at least one processor, the each portion inspected by the inspection unit when elapsed time of a process performed by the each portion reaches a value of the time variable.

8. A non-transitory storage medium storing a program, when executed by a processor, causes a computer to perform:

storing, in a storage region, a first unique value calculated for each portion of a program in advance, a caller of the each portion, a memory address of the each portion in a storage region of the program, the first unique value in association with each other for the each portion of the program, and a combination of the caller and a value of a time variable in association with the first unique value;

inspecting whether or not there is a tampering in the each portion by newly calculating a second unique value for the each portion and comparing the first unique value with the second unique value, specifying the each portion inspected by an inspection unit based on the caller; and switching the each portion inspected by the inspection unit when elapsed time of a process performed by the each portion reaches a value of the time variable.

\* \* \* \* \*